(12) United States Patent
Payne (10) Patent No.: US 6,867,770 B2
(45) Date of Patent: Mar. 15, 2005

(54) SYSTEMS AND METHODS FOR VOXEL WARPING

(75) Inventor: Bradley A. Payne, Andover, MA (US)

(73) Assignee: SensAble Technologies, Inc., Woburn, MA (US)

( * ) Notice: Subject to any disclaimer, the term of this patent is extended or adjusted under 35 U.S.C. 154(b) by 216 days.

(21) Appl. No.: 10/017,703

(22) Filed: Dec. 14, 2001

(65) Prior Publication Data

US 2002/0075283 A1 Jun. 20, 2002

Related U.S. Application Data

(60) Provisional application No. 60/255,530, filed on Dec. 14, 2000.

(51) Int. Cl.$^7$ ............................................. G60T 17/00

(52) U.S. Cl. ..................... 345/420; 345/424; 345/582; 345/643; 345/646; 345/647; 345/648

(58) Field of Search ............................. 345/420, 582, 345/424, 643, 646, 647, 648

(56) References Cited

U.S. PATENT DOCUMENTS

| | | | |
|---|---|---|---|
| 2,475,484 A | 7/1949 | DeNise ........................ 318/628 |
| 3,168,203 A | 2/1965 | Gallistel ......................... 214/1 |
| 3,263,824 A | 8/1966 | Jones et al. .................... 214/1 |
| 3,449,008 A | 6/1969 | Colechia ...................... 294/88 |
| 3,531,868 A | 10/1970 | Stevenson .................... 33/174 |
| 3,618,786 A | 11/1971 | Fick ........................ 214/1 CM |
| 3,637,092 A | 1/1972 | George et al. ............ 214/1 CM |
| 3,920,972 A | 11/1975 | Corwin et al. ............ 235/151.1 |
| 3,944,798 A | 3/1976 | Eaton ....................... 235/161.3 |
| 4,062,455 A | 12/1977 | Flatau ............................. 214/1 |
| 4,150,803 A | 4/1979 | Fernandez .............. 244/135 A |
| 4,216,467 A | 8/1980 | Colston .................. 340/365 L |
| 4,302,138 A | 11/1981 | Zarudiansky .................. 414/5 |
| 4,367,532 A | 1/1983 | Crum et al. ................. 364/513 |
| 4,420,808 A | 12/1983 | Diamond et al. ........... 364/434 |
| 4,521,685 A | 6/1985 | Rebman ...................... 250/229 |
| 4,604,016 A | 8/1986 | Joyce ............................. 414/7 |

(List continued on next page.)

FOREIGN PATENT DOCUMENTS

| | | | |
|---|---|---|---|
| EP | 0 915 434 A2 | 5/1999 | .......... G06T/15/50 |
| WO | WO 95/02801 | 1/1995 | .......... G01B/7/03 |
| WO | WO 96/16397 | 5/1996 | .......... G09G/5/08 |

(List continued on next page.)

OTHER PUBLICATIONS

US 5,903,456, 5/1999, Schena et al. (withdrawn)

Avila et al., "A Haptic Interaction Method for Volume Visualization," Proceedings Visualiation '96 Sponsored by IEEE Computer Society Technical Committee on Computer Graphics (1996), pp. 197–204.*

"Revival of the Virtual Lathe," University of Michigan Virtual Reality Laboratory, http://www–vrl.umich.edu/sel_prj/lathe/, (Dec. 20, 2002).

(List continued on next page.)

*Primary Examiner*—Kimbinh T. Nguyen
(74) *Attorney, Agent, or Firm*—Testa, Hurwitz & Thibeault, LLP (57) ABSTRACT

Systems and methods for calculating a modification of a geometrical shape by applying an inverse modification function to an array representing the shape. An array representing the geometrical shape is defined on a multi-dimensional space. A modification function is used to modify the geometrical shape. A user or a programmed computer can select the modification function. The computer applies an inverse of the modification function to the array. The computer deduces a change in the geometrical shape from the modified array. An advantage of the system and method is the ability to compute shape changes in certain situations where a direct computation is cumbersome or otherwise inconvenient.

36 Claims, 8 Drawing Sheets

U.S. PATENT DOCUMENTS

| | | |
|---|---|---|
| 4,632,341 A | 12/1986 | Repperger et al. .......... 244/230 |
| 4,638,798 A | 1/1987 | Shelden et al. ......... 128/303 B |
| 4,653,011 A | 3/1987 | Iwano ....................... 364/513 |
| 4,654,648 A | 3/1987 | Herrington et al. ......... 340/710 |
| 4,655,673 A | 4/1987 | Hawkes ..................... 414/730 |
| 4,661,032 A | 4/1987 | Arai ............................. 414/5 |
| 4,670,851 A | 6/1987 | Murakami et al. .......... 364/518 |
| 4,676,002 A | 6/1987 | Slocum ...................... 33/1 MP |
| 4,680,519 A | 7/1987 | Chand et al. ............... 318/568 |
| 4,703,443 A | 10/1987 | Moriyasu .................... 364/559 |
| 4,729,098 A | 3/1988 | Cline et al. ................. 364/414 |
| 4,769,763 A | 9/1988 | Trieb et al. ................. 364/559 |
| 4,791,934 A | 12/1988 | Brunnett .................... 128/653 |
| 4,795,296 A | 1/1989 | Jau ............................ 414/5 |
| 4,800,721 A | 1/1989 | Cemenska et al. ............. 60/393 |
| 4,819,195 A | 4/1989 | Bell et al. ................. 364/571.1 |
| 4,823,634 A | 4/1989 | Culver ...................... 74/471 |
| 4,837,734 A | 6/1989 | Ichikawa et al. ............ 364/513 |
| 4,839,838 A | 6/1989 | LaBiche et al. ......... 364/709.1 |
| 4,853,874 A | 8/1989 | Iwamoto et al. ............. 364/513 |
| 4,888,538 A | 12/1989 | Dimitrov et al. ........... 318/675 |
| 4,893,981 A | 1/1990 | Yoshinada et al. ............. 414/5 |
| 4,907,970 A | 3/1990 | Meenen, Jr. .................. 434/45 |
| 4,907,973 A | 3/1990 | Hon .......................... 434/262 |
| 4,942,538 A | 7/1990 | Yuan et al. ................. 364/513 |
| 4,945,305 A | 7/1990 | Blood ..................... 324/207.2 |
| 4,945,501 A | 7/1990 | Bell et al. ................. 364/571.1 |
| 4,961,138 A | 10/1990 | Gorniak ....................... 364/200 |
| 4,973,215 A | 11/1990 | Karlen et al. ............... 414/729 |
| 4,982,504 A | 1/1991 | Söderberg et al. ............. 33/502 |
| 4,988,981 A | 1/1991 | Zimmerman et al. ......... 340/709 |
| 5,004,391 A | 4/1991 | Burdea .......................... 414/6 |
| 5,007,300 A | 4/1991 | Siva ........................... 74/471 X |
| 5,018,922 A | 5/1991 | Yoshinada et al. ............. 414/5 |
| 5,019,761 A | 5/1991 | Kraft ........................ 318/568.1 |
| 5,038,089 A | 8/1991 | Szakaly ................... 318/568.1 |
| 5,040,306 A | 8/1991 | McMurtry et al. ............. 33/556 |
| 5,044,956 A | 9/1991 | Behensky et al. ............. 434/45 |
| 5,053,975 A | 10/1991 | Tsuchihashi et al. ........ 364/513 |
| 5,072,361 A | 12/1991 | Davis et al. ................. 364/167 |
| 5,088,046 A | 2/1992 | McMurtry .................. 364/474 |
| 5,088,055 A | 2/1992 | Oyama ....................... 364/560 |
| 5,103,404 A | 4/1992 | McIntosh ................. 318/568.2 |
| 5,105,367 A | 4/1992 | Tsuchihashi et al. ............ 395/99 |
| 5,116,051 A | 5/1992 | Moncrief et al. ......... 273/448 B |
| 5,116,180 A | 5/1992 | Fung et al. .................... 414/5 |
| 5,130,632 A | 7/1992 | Ezawa et al. ............. 318/568.1 |
| 5,131,844 A | 7/1992 | Marinaccio et al. ........... 433/72 |
| 5,142,931 A | 9/1992 | Menahem ............. 74/471 XY |
| 5,143,505 A | 9/1992 | Burdea et al. .................. 414/5 |
| 5,184,319 A | 2/1993 | Kramer ...................... 364/806 |
| 5,185,561 A | 2/1993 | Good et al. ................. 318/432 |
| 5,189,806 A | 3/1993 | McMurtry et al. ............. 33/503 |
| 5,193,963 A | 3/1993 | McAffee et al. ................. 414/5 |
| 5,204,824 A | 4/1993 | Fujimaki .................... 364/474 |
| 5,220,260 A | 6/1993 | Schuler ....................... 318/561 |
| 5,223,776 A | 6/1993 | Radke et al. ............. 318/568.1 |
| 5,237,647 A | 8/1993 | Roberts et al. ............. 345/419 |
| 5,239,246 A | 8/1993 | Kim ........................ 318/568.1 |
| 5,255,211 A | 10/1993 | Redmond ................... 364/578 |
| 5,264,768 A | 11/1993 | Gregory et al. ............. 318/561 |
| 5,266,875 A | 11/1993 | Slotine et al. ............. 395/99 X |
| 5,333,257 A | 7/1994 | Merrill et al. ............... 345/467 |
| 5,354,162 A | 10/1994 | Burdea et al. .................. 414/5 |
| 5,382,885 A | 1/1995 | Salcudean et al. ......... 318/568.1 |
| 5,389,865 A | 2/1995 | Jacobus et al. ........... 318/568.1 |
| 5,396,265 A | 3/1995 | Ulrich et al. ................ 345/158 |
| 5,414,337 A | 5/1995 | Schuler ....................... 318/561 |
| 5,429,140 A | 7/1995 | Burdea et al. .............. 128/774 |
| 5,438,529 A | 8/1995 | Rosenberg et al. ...... 364/709.1 |
| 5,446,834 A | 8/1995 | Deering ...................... 345/427 |
| 5,459,382 A | 10/1995 | Jacobus et al. ........... 318/568.1 |
| 5,482,051 A | 1/1996 | Reddy et al. ................ 128/733 |
| 5,489,830 A | 2/1996 | Fernandez ................... 318/628 |
| 5,497,452 A | 3/1996 | Shimizu et al. .............. 395/120 |
| 5,515,078 A | 5/1996 | Greschler et al. ............ 345/156 |
| 5,555,894 A | 9/1996 | Doyama et al. ............. 128/782 |
| 5,559,412 A | 9/1996 | Schuler ....................... 318/561 |
| 5,576,727 A | 11/1996 | Rosenberg et al. .......... 345/179 |
| 5,587,937 A | 12/1996 | Massie et al. ............... 364/578 |
| 5,589,854 A | 12/1996 | Tsai ........................... 345/161 |
| D377,932 S | 2/1997 | Schena et al. ............. D14/114 |
| 5,623,582 A | 4/1997 | Rosenberg ..................... 395/99 |
| 5,623,642 A | 4/1997 | Katz et al. ................... 395/500 |
| 5,625,576 A | 4/1997 | Massie et al. ............... 364/578 |
| 5,629,594 A | 5/1997 | Jacobus et al. ........... 318/568.1 |
| 5,642,469 A | 6/1997 | Hannaford et al. ............ 395/99 |
| 5,659,493 A | 8/1997 | Kiridena et al. ................. 703/2 |
| 5,666,138 A | 9/1997 | Culver ........................ 345/161 |
| 5,691,898 A | 11/1997 | Rosenberg et al. .......... 364/190 |
| 5,694,013 A | 12/1997 | Stewart et al. ............... 318/561 |
| 5,701,140 A | 12/1997 | Rosenberg et al. ......... 345/156 |
| 5,721,566 A | 2/1998 | Rosenberg et al. .......... 345/161 |
| 5,724,264 A | 3/1998 | Rosenberg et al. .......... 364/559 |
| 5,731,804 A | 3/1998 | Rosenberg .................. 345/156 |
| 5,734,373 A | 3/1998 | Rosenberg et al. .......... 345/161 |
| 5,737,505 A | 4/1998 | Shaw et al. .................. 395/119 |
| 5,739,811 A | 4/1998 | Rosenberg et al. .......... 345/161 |
| 5,742,278 A | 4/1998 | Chen et al. .................. 345/156 |
| 5,751,289 A | 5/1998 | Myers ........................ 345/419 |
| 5,754,023 A | 5/1998 | Roston et al. ............... 318/561 |
| 5,767,839 A | 6/1998 | Rosenberg .................. 345/161 |
| 5,769,640 A | 6/1998 | Jacobus et al. .............. 434/262 |
| 5,774,130 A | 6/1998 | Horikawa et al. ............ 345/441 |
| 5,784,542 A | 7/1998 | Ohm et al. ..................... 395/95 |
| 5,790,108 A | 8/1998 | Salcudean et al. ........... 345/184 |
| 5,798,752 A | 8/1998 | Buxton et al. ............... 345/146 |
| 5,800,177 A | 9/1998 | Gillio ......................... 434/262 |
| 5,800,178 A | 9/1998 | Gillio ......................... 434/262 |
| 5,800,179 A | 9/1998 | Bailey ....................... 434/262 |
| 5,802,353 A | 9/1998 | Avila et al. .................. 395/500 |
| 5,803,738 A | 9/1998 | Latham ........................ 434/29 |
| 5,805,140 A | 9/1998 | Rosenberg et al. .......... 345/161 |
| 5,821,920 A | 10/1998 | Rosenberg et al. .......... 345/156 |
| 5,825,308 A | 10/1998 | Rosenberg .................... 341/20 |
| 5,828,197 A | 10/1998 | Martin et al. ................ 318/567 |
| 5,831,408 A | 11/1998 | Jacobus et al. ........... 318/568.1 |
| 5,844,392 A | 12/1998 | Peurach et al. ........... 318/568.2 |
| 5,847,956 A | 12/1998 | Bronfeld et al. ............... 700/98 |
| 5,859,934 A | 1/1999 | Green ......................... 382/296 |
| 5,872,438 A | 2/1999 | Roston ..................... 318/568.11 |
| 5,873,106 A | 2/1999 | Joseph ........................ 715/506 |
| 5,880,714 A | 3/1999 | Rosenberg et al. .......... 345/156 |
| 5,882,206 A | 3/1999 | Gillio ......................... 434/262 |
| 5,889,670 A | 3/1999 | Schuler et al. .............. 364/186 |
| 5,898,599 A | 4/1999 | Massie et al. ............... 345/161 |
| 5,903,270 A | 5/1999 | Gentry et al. |
| 5,903,886 A | 5/1999 | Heimlich et al. .............. 706/50 |
| 5,907,487 A | 5/1999 | Rosenberg et al. .......... 364/190 |
| 5,913,727 A | 6/1999 | Ahdoot ......................... 463/39 |
| 5,929,607 A | 7/1999 | Rosenberg et al. .......... 320/166 |
| 5,929,846 A | 7/1999 | Rosenberg et al. .......... 345/161 |
| 5,956,484 A | 9/1999 | Rosenberg et al. ....... 395/200.3 |
| 5,963,212 A | * 10/1999 | Bakalash .................... 345/424 |
| 5,973,678 A | * 10/1999 | Stewart et al. .............. 345/184 |
| 5,988,862 A | 11/1999 | Kacyra et al. .................. 703/6 |
| 6,064,394 A | 5/2000 | Morrison |
| 6,084,587 A | 7/2000 | Tarr et al. ................... 345/419 |
| 6,111,577 A | 8/2000 | Zilles et al. ................. 345/701 |
| 6,191,796 B1 | 2/2001 | Tarr ........................... 345/433 |
| 6,211,848 B1 | 4/2001 | Plesniak et al. ............. 345/156 |

| | | | |
|---|---|---|---|
| 6,226,003 B1 | 5/2001 | Akeley | 345/419 |
| 6,308,144 B1 | 10/2001 | Bronfeld et al. | 703/2 |
| 6,337,678 B1 | 1/2002 | Fish | 345/156 |
| 6,342,880 B2 | 1/2002 | Rosenberg et al. | 345/161 |
| 6,369,834 B1 | 4/2002 | Zilles et al. | 345/701 |
| 6,384,822 B1 | 5/2002 | Bilodeau et al. | 345/422 |
| 6,405,158 B1 | 6/2002 | Massie et al. | |
| 6,417,638 B1 | 7/2002 | Guy et al. | 318/560 |
| 6,421,048 B1 | 7/2002 | Shih et al. | 345/419 |
| 6,552,722 B1 | 4/2003 | Shih et al. | 345/19 |
| 6,608,631 B1 * | 8/2003 | Milliron | 345/647 |
| 2002/0075283 A1 | 6/2002 | Payne | 345/643 |
| 2002/0089500 A1 | 7/2002 | Jennings et al. | 345/420 |
| 2002/0158842 A1 | 10/2002 | Guy et al. | 345/156 |
| 2003/0117411 A1 | 6/2003 | Fujiwara et al. | |

FOREIGN PATENT DOCUMENTS

| | | | |
|---|---|---|---|
| WO | WO 96/22591 | 7/1996 | G09G/5/00 |
| WO | WO 96/42078 | 12/1996 | G09G/3/02 |
| WO | WO 97/06410 | 2/1997 | G01C/7/00 |
| WO | WO 97/12337 | 4/1997 | G06F/19/00 |
| WO | WO 97/12357 | 4/1997 | G09G/5/00 |
| WO | WO 97/19440 | 5/1997 | G09G/5/00 |
| WO | WO 97/21160 | 6/1997 | |
| WO | WO 97/44775 | 11/1997 | G09G/5/08 |
| WO | WO 98/06024 | 2/1998 | G06F/3/00 |
| WO | WO 98/26342 | 6/1998 | |
| WO | WO 98/30951 | 7/1998 | G06F/3/02 |
| WO | WO 98/58308 | 12/1998 | G06F/3/033 |
| WO | WO 98/58323 | 12/1998 | G06F/15/00 |
| WO | WO 99/10872 | 3/1999 | G09G/5/00 |

OTHER PUBLICATIONS

Fuentes et al., "The Virtual Tool Approach to Dextrous Telemanipulation," Proceedings of the 1996 IEEE International Conference on Robotics and Automation (Minneapolis, MN), pp. 1700–1705 (Apr. 1996).

"3–D Animation Workshop," printed Jul. 29, 2003, http://webreference.com/3d/, Lessons 39, 64–68, and 72; 79 pgs.

Alejandre, "What is a Tessellation?" *The Math Forum, Drexel University*, printed Jul. 29, 2003, http://mathforum.org/sum95,suzanne,whattess.html, 4 pgs.

Altmann, "About Nonuniform Rational B–Splines—NURBS," Worcester Polytechnic Institute, printed Jul. 29, 2003, http://www.cs.wpi.edu/~matt/courses/cs563/talks/nurbs.html, 6 pgs.

Arraich, "Quick Mask," http://www.arraich.com/ref/aatool$_{13}$quick_mask6.htm, 3 pgs.

Bentley, "Rendering Cubic Bezier Patches," Worcester Polytechnic Institute, printed Nov. 17, 2003, http://www.cs.wpi.edu/~matt/courses/cs563/takls/surface/bez_surf.html, 10 pgs.

Birn, "Tutorial: NURBS Head Modeling," printed Jul. 29, 2003, http://www.3drender.com/jbirn/ea/HeadModel.html, 5 pgs.

"Curves," *Avid Technology*, printed Nov. 06, 2003, http://www.iro.umontreal.ca/~roys/softimage/html/model/curves.html, chapter 10, 10 pgs.

Farin, "NURBS," printed Nov. 17, 2003, www.eros.cagd.eas.asu.edu/~farin/rbook/toc.html, 2 pgs.

Feldman, "Texture Mapping," http://www.geocities.com/SiliconValley/2151/tmap.html (22 pgs.).

Fisher et al., "Pixel Values," http://www/dia.ed.ac.uk/HIPR2/value.htm (1 pg.).

Foskey et al, "*ArtNova*: Touch–Enabled 3D Model Design," Proceedings of IEEE Virtual Reality 2002, Mar. 24–28, 2002, Orlando, Florida pp. 119–126.

"Fundamentals of NURBS Modeling," *Avid Technology*, printed Nov. 06, 2003, http://www.iro.umontreal.ca/~roys/softimage/html/model/nurbs_basics.html, chapter 9, 7 pgs.

Gu et al., "Global Conformal Surface Parameterization," Eurographics Symposium on Geometry Processing (2003), 12 pgs.

"How to use Postscript Art as a Stencil in Photoshop," *Swanson Tech Support, Photoshop Techniques* 004, 4 pgs.

Komerska et al., "Haptic Interface for Center–of–Workspace Interaction: Demonstration Paper," *Haptics Interfaces for Virtual Environments and Teleoperator Systems* (*2002*), pp. 352–353.

Komerska et al., "Haptic Task Constraints for 3D Interactions, " *Proceedings, IEEE Haptics Interfaces for Virtual Environments and Teleoperator Systems*, (Mar. 22–23, 2003), pp. 270–277.

Lenzmeier, "Color Depth and Color Spaces," http://www.csbsju.edu/itservices/teaching/c_space/colors.htm (3 pgs.).

"Lesson 12: Blur, Sharpen & Smudge," http://iit.bloomu.edu/vthc/Photoshop/enhancing/blurring.htm, 3 pgs.

"Lesson 14: Selection Tools," http://iit.bloomu.edu/vthc/Photoshop/BLENDING/selectiontools.htm, 7 pgs.

"Lesson 18: Opacity," http://iit.bloomu.edu/vthc/Photoshop/SpecialEffects/opacity.htm, 2 pgs.

"Lesson 22: Vector Shapes," http://iit.bloomu.edu/vthc/Photoshop/DRAWING/vectorshapes.htm (5 pgs.).

"Lesson 23: Gradients," http://iit.bloomu.edu/vthc/Photoshop/DRAWING/gradients.htm (7 pgs).

"Lesson 19: Color Selection ," http://iit.bloomu.edu/vthc/Photoshop/DRAWING/colorpicker.htm (4 pgs.).

"Lesson 4: Layers," http://iit.bloomu.edu/vthc/Photoshop/Basics/layers.htm (2 pgs.).

"Lesson 7: Color Balance ," http://iit.bloomu.edu/vthc/Photoshop/enhancing/colorbalance.htm (3 pgs.).

"Lesson 8: Brightness & Contrast," http://iit.bloomu.edu/vthc/Photoshop/enhancing/brightness&contrast.htm (2 pgs.).

Miller et al., "The Design of 3D Haptic Widgets," Proceedings of the 1999 Symposium on Interactive 3D Graphics Conference Proceedings, (1999) pp. 1–6.

Nagel, "A Closer Look: Photoshop's New Paint Engine, p. 2 of 3," Mar. 07, 2002, http://www.creativemac.com/2002/03$_{13}$mar/features/ps7dynamics1.htm (6 pgs.).

Nagel, "A Closer Look: Photoshop's New Paint Engine, p. 3 of 3" Mar. 07, 2002, http://www.creativemac.com/2002/03_mar/features/ps7dynamics1.htm (5 pgs.).

Nagel, "A Closer Look: Photoshop's New Paint Engine," Mar. 07,2002, http://www.creativemac.com/2002/03_mar/features/ps7dynamics1.htm (5 pgs.).

O'Rourke, "Comp.Graphics.Algorithms Frequently Asked Questions, Section 5. 3D Computations," http://www.exaflop.org/docs/cgafaq/cga5.html (13 pgs).

"Points, Nets, Patches . . . " printed Nov. 17, 2003, http://www.people.nnov.ru/fractal/splines/nets.htm, 2 pgs.

Porter et al., "Compositing Digital Images," Computer Graphics, vol. 18, No. 3, Jul. 1984, pp. 253–259.

Powerful Photoshop Layers: Layer Effects Settings, http://www/webreference.com/graphics/column32/5.html (5 pgs.).

"Raindrop Geomagic, Inc. product description for Geomagic Shape," Oct. 3, 2003 printout, http://www.geomagic.com/products/shape, 2 pgs.

"Raindrop Geomagic, Inc. product description for Geomagic Shape," Nov. 26, 2003 printout, http://www.geomagic.com/products/shape, 2 pgs.

"Raindrop Geomagic, Inc. product description for Geomagic Studio," http://www.macdac.com/raindrop/studio.htm (4 pgs.).

Rea, "Digital Photography and Electronic Imaging Glossary," Versions 7.5.2 (Aug. 2000), 40 pgs.

Rogers, "An Introduction to NURBS," *Morgan Kaufmann Publishers*, (2000), pp. 1–4.

"Sensable Technologies, Feature Overview," Nov. 25, 2003 printout, http://www.sensable.com/products/3ddesign/freeform/overview.asp, 5 pgs.

"Sensable Technologies, Feature Overview: Emboss with Wrapped Image," Nov. 25, 2003 printout, http://www.sensable.com/products/3ddesign/freeform/emboss_with_wrap.asp, 1 pg.

"Sensable Technologies, Free Form Concept System," Jan. 20, 2004 printout, http://www.sensable.com/products/3ddesign/concept/index.asp, 2 pgs.

Sharman, "The Marching Cubes Algorithm," http://www.exaflop.org/docs/marchcubes/ind.html (6 pgs.).

Sorkine, et. al, "Bounded–distortion Piecewise Mesh Parameterization," Proceedings of the Conference on Visualization 2002, Boston, Massachusetts, pp. 355–362.

Surfaces, *Avid Technology*, printed Nov. 06, 2003, http://www.iro.umontreal.ca/~roys/softimage/html/model/surfs.html, chapter 11, 22 pgs.

"Tensor Product Spline Surfaces," printed Nov. 17, 2003, http://www.ibiblio.org/e–notes/Splines/Inter.htm, 3 pgs.

"Touch–Enabled 3D Model Design," Department of Computer Science, University of North Carolina at Chapel Hill (Feb. 2002), 2pgs.

Weisstein, "Conformal Mapping," *Wolfram Research*, printed Nov. 11, 2003, http://mathworld.wolfram.com/ConformalMapping.html, 7 pgs.

Adachi, "Touch and Trace on the Free–Form Surface of Virtual Object," Proceedings of IEEE Virtual Reality Annual International Symposium, Sep. 18–22, 1993, Seattle WA, pp. 162–168.

Agrawala et al., "3D Painting on Scanned Surfaces", Stanford University, 1995, pp. 145–150.

Atkinson et al., "Computing with Feeling" COMPUT. & GRAPHICS, vol. 2, 1977, pp. 97–103.

Avila et al., "A Haptic Interaction Method for Volume Visualization," GE Corporate Research & Development, Schenectady, NY, pp. 1–9 (1996).

Barr, "Global and Local Deformations of Solid Primitives"; COMPUTER GRAPHICS: vol. 18, No. 3, pp. 21–30 (Jul., 1984).

Bergamasco, "Design of Hand Force Feedback Systems for Glove–like Advanced Interfaces", IEEE, Sep. 1992, pp. 286–293.

Blinn, "Simulation of Wrinkled Surfaces," COMPUTER GRAPHICS, vol. 12–3, Aug. 1978, pp. 286–292.

Brooks et al., "Project GROPE—Haptic Displays for Scientific Visualization," COMPUTER GRAPHICS, vol. 24, No. 4, Aug. 1990, pp. 177–185.

Burdea, "Force And Touch Feedback For Virtual Reality," John Wiley and Sons, Inc., New York, New York, pp. 190–193 (1996).

Colgate et al., "Factors Affecting the Z–Width of a Haptic Display," published by IEEE Computer Society Press, Los Alamitos, California, in Proceedings: 1994 IEEE International Conference On Robotics and Automation, held May 8–13, 1994 in San Diego, California, vol. 4, 1994, pp. 3205–3210.

Colgate et al., "Implementation of Stiff Virtual Walls in Force Reflecting Interfaces," IEEE Virtual Reality Annual International Symposium (Seattle, WA), pp. 202–208 (Sep. 18–22, 1993).

Colgate et al., "Issues in the Haptic Display of Tool Use," published by IEEE Computer Society Press, Los Alamitos, California, in Proceedings: 1995 IEEE/RSJ International Conference on Intelligent Robots and Systems—Human Robot Interaction and Cooperative Robots, held Aug. 5–9, 1995 in Pittsburgh, Pennsylvania, 1995, pp. 140–145.

Decaudin, "Geometric Deformation by Merging a 3D–Object with a Simple Shape," Graphics Interface '96 Proceedings (Toronto, Canada), 6 pgs. (May 21–24, 1996).

Dworkin et al., "A New Model for Efficient Dynamic," Fourth Eurographics Animation and Simulation Workshop Proceedings Eurographics Technical Report Series, ISSN 1017–4656, Sep. 4–5, 1993, pp. 135–147.

Galyean, "Sculpting: An Interactive Volumetric Modeling Technique," Computer Graphics (SIGGRAPH '91 Las Vegas), vol. 25, No. 4, pp. 267–274 (Jul. 1991).

Hashimoto et al., "Dynamic Force Simulator for Force Feedback Human–Machine Interaction", IEEE, Sep. 1993, pp. 209–215.

Hirata et al., "3–Dimensional Interface Device for Virtual Work Space," Proceedings of the 1992 IEEE, Jul. 7–10, 1992, pp. 889–896.

Hirota et al., "Providing Force Feedback in Virtual Environments", IEEE, Sep. 1995, pp. 22–30.

Hirota et al., "Development of Surface Display," Proceedings of the Virtual Reality Annual International Symposium (Seattle), pp. 256–262 (Sep. 18–23, 1993).

Howe et al., "Task Performance with a Dextrous Teleoperated Hand System," Telemanipulator Technology, Nov. 1992, Proceedings of SPIE, vol. 1833, pp. 1–9.

Immersion Corporation, "Impulse Engine 2000," http://www.immerse.com/WWWpages/IE2000pg.htm, 2 pages (1997).

Immersion Corporation, "Laparoscopic IMPULSE ENGINE☐: A New FORCE FEEDBACK Surgical Simulation Tool", Immersion Corporation, 1995. http://www.immerse.com/wwwpages/lapIEpg.htm.

Immersion Corporation, "Medical Simulation," 1 page, (undated).

Immersion Corporation, "The IMPULSE ENGINE☐", 1 page, Immersion Corporation, 1996.

Immersion Corporation, "Virtual Laparoscopic Interface", Immersion Corporation, 1995, 1 pg.

Inoue et al., "Parallel Manipulator," Proceedings of 3rd Robotics Research: The Third International Symposium, Faugeras & Giralt, eds., MIT Press 1986.

Ishii et al., "A 3D Interface Device with Force Feedback: A Virtual Work Space for Pick–and–Place Tasks", IEEE, Sep. 1993, pp. 331–335.

Iwata, "Pen–based Haptic Virtual Environment," Proceedings of IEEE Virtual Reality Annual International Symposium, (Sep. 18–22, 1993, Seattle, WA), pp. 287–292.

Iwata, "Artificial Reality with Force–feedback: Development of Desktop Virtual Space with Compact Master Manipulator," Computer Graphics (SIGGRAPH '90 Dallas), vol. 24, No. 4, pp. 165–170 (Aug. 1990).

Kelley et al. "MagicMouse: Tactile and Kinesthetic Feedback in the Human–Computer Interface Using an Electromagnetically Actuated Input/Output Device," Department of Electrical Engineering, University of British Columbia, Vancouver, BC, V6T 1Z4, Canada, Oct. 19, 1993, pp. 1–27.

Kotoku et al., "A Force Display Algorithm for Virtual Environments," SICE, pp. 347–355, 1992.

Kraft Ocean Systems, "Grips Underwater Manipulator System".

Kraft Telerobotics, Inc., "GRIPS Force Feedback Manipulator System,".

Kraft Telerobotics, Inc., "GRIPS Master/Slave Manipulator System," 1988.

Lewis, "Electronic Pen With Its Own Eraser", Personal Computers, Jul., 1995, p. C8.

Marcus et al., "EXOS Research on Master Controllers for Robotic Devices," Fifth Annual Workshop on Space Operations Applications and Research (SOAR '91) pp. 238–245, Jul. 1991.

Massie, "Design of a Three Degree of Freedom Force–Reflecting Haptic Interface", Massachusetts Institute of Technology; Bachelor of Science in Electrical Science and Engineering Thesis, May, 1993, pp. 1–38.

Massie, "Initial Haptic Explorations with the Phantom: Virtual Touch Through Point Interaction", Massachusetts Institute of Technology Master of Science Thesis, Feb., 1996, pp. 1–49. (not admitted as prior art).

McAffee et al, "Teleoperator Subsystem/Telerobot Demonstrator," Force Reflecting Hand Controller Equipment Manual, Jet Propulsion Laboratory, Jan. 1988.

Millman et al., "A System for the Implementation and Kinesthetic Display of Virtual Environments," Telemanipulator Technology, Proceedings of 1992 SPIE, vol. 1833, pp. 49–56.

Minsky et al., "Feeling and Seeing: Issues in Force Display," COMPUTER GRAPHICS, vol. 24, No. 2, Mar. 1990, pp. 235–270.

Minsky, "Computational Haptics: The Sandpaper System for Synthesizing Texture for a Force–Feedback Display," Massachusetts Institute of Technology Ph.D. Thesis, Jun., 1995, pp. 1–217.

Morganbesser, "Force Shading for Shape Perception in Haptic Virtual Environments", Massachusetts Institute of Technology Master of Engineering Thesis, Sep., 1995, pp. 1–77.

MPB Technologies, Inc., "Freedom 3/6," 6 pages, 1996.

Payne et al., "Distance Field Manipulation of Surface Models," IEEE Computer Graphics & Applications, pp. 65–71 (Jan. 1992).

Salcudean et al., "On the Emulation of Stiff Walls and Static Friction with a Magnetically Levitated Input/Output Device," DYNAMIC SYSTEMS and CONTROL: vol. 1, DSC–vol. 55–1, 1994, pp. 303–309.

Salisbury et al., "Haptic Rendering: Programming Touch Interaction with Virtual Objects," Presented and disseminated at the 1995 Symposium on Interactive 3D Graphics held Apr. 9–12, 1995 in Monterey, CA, sponsored by the Association for Computing Machinery (ACM) and published by the ACM in Proceedings: 1995 Symposium on Interactive 3D Graphics, Monterey, California, Apr. 9–12, 1995, pp. 123–130.

SensAble Devices, Inc., "GHOST Brochure," 1995, Cambridge, MA 92 pgs).

SensAble Technologies, Inc., "Phantom Haptic Interface," 1996, Cambridge, MA (6 pgs).

Shimoga, "A Survey of Perceptual Feedback Issues in Dextrous Telemanipulation: Part I. Finger Force Feedback" published by IEEE Neural Networks Council in IEEE Virtual Reality Annual International Symposium, held Sep. 18–22, 1993 in Seattle, Washington, 1993, pp. 263–270.

Snow et al., "Compact Force–Reflecting Hand Controller," NASA Tech Brief, vol. 15, No. 4 from Jet Propulsion Laboratory Report NPO–17851–7348, Apr. 1991, pp. i, 1–3, 1a–11a, 14a, 15a.

Sutter et al., "Response to Reflected–Force Feefback to Fingers in Teleoperations," Proc. of the NASA Conference On Space Telerobotics, pp. 65–74, NASA JPL, Jan. 1989.

Swarup, "Haptic Interaction with Deformable Objects Using Real–Time Dynamic Simulation", Massachusetts Institute of Technology, Sep. 1995, pp. 1–83.

Tanie et al., "Force Display Algorithms", 1993 IEEE International Conference on Robotics and Automation, May 2–7, 1993, Atlanta Georgia, USA, 1993, pp. 60–78.

Terzopoulos et al.; "Elastically Deformable Models"; COMPUTER GRAPHICS, vol. 21, No. 4, pp. 205–214 (Jul., 1987).

Wang et al., "Volume Sculpting", 1995 Symposium on Interactive 3D Graphics, Monterey, California, pp. 151–156.

Yoshikawa et al., "Construction of Virtual World Using Dynamics Modules and Interaction Modules," Proceedings of the 1996 IEEE International Conference on Robotics and Automation (Minneapolis, MN), pp. 2358–2364 (Apr. 1996).

Zilles et al., "A Constraint–Based God–object Method for Haptic Display," published by IEEE Computer Society Press, Los Alamitos, California, in Proceedings of the 1995 IEEE/RSJ International Conference on Intelligent Robots and Systems—Human Rotob Interaction and Cooperative Robots, held Aug. 5–9, 1995 in Pittsburgh, Pennsylvania, 1995, pp. 146–151.

Zilles, "Haptic Rendering with the Toolhandle Haptic Interface," Massachusetts Institute of Technology Master of Science Thesis, May 1995, pp. 1–46.

Elhajj et al., "Supermedia–Enhanced Internet–Based Telerobotics," Proceedings of the IEEE, vol. 91, No. 3, pp. 396–421 (Mar. 2003).

Luo et al., "Networked Intelligent Robots Through the Internet: Issues and Opportunities," Proceedings of the IEEE, vol. 91, No. 3, pp. 371–382 (Mar. 2003).

Oboe, "Force–Reflecting Teleoperation Over the Internet: The JBIT Project," Proceedings of the IEEE, vol. 91, No. 3, pp. 449–462 (Mar. 2003).

Safaric et al., "Control of Robot Arm with Virtual Environment via the Internet," Proceedings of the IEEE, vol. 91, No. 3, pp. 422–429 (Mar. 2003).

Tan et al., "Virtual Environments for Internet–Based Robots—I: Modeling a Dynamic Environment," Proceedings of the IEEE, vol. 91, No. 3, pp. 383–388 (Mar. 2003).

Tan et al., "Virtual Environments for Internet–Based Robots—II: Path Planning," Proceedings of the IEEE, vol. 91, No. 3, pp. 389–395 (Mar. 2003).

* cited by examiner

A - SCRATCH BUFFER REGION
B - REGION OF INFLUENCE FOR WARP
C - ORIGINAL VOXEL MODEL

FIG. 5

A - UNMODIFIED VOXELS
B - RESAMPLED VOXELS

SYSTEMS AND METHODS FOR VOXEL WARPING

CROSS-REFERENCE TO RELATED APPLICATIONS

This application claims the benefit of U.S. provisional patent application Ser. No. 60/255,530, filed Dec. 14, 2000, which application is incorporated herein in its entirety by reference.

FIELD OF THE INVENTION

This invention relates generally to multi-dimensional modeling. More particularly, the invention relates to modeling using a change in the representation of the object to be modeled.

BACKGROUND OF THE INVENTION

Traditional tools for computer-based editing of three-dimensional models are surface based. Often, a model is represented as a collection of surface elements such as polygons or NURBS. Such tools support aggregation, repositioning and deformation of models readily, but do not lend themselves to topological modifications such as punching holes. These models also do not readily provide a watertight model, that is, one that unambiguously separates inside from outside at every point in space. For example, a collection of surface elements can leave an unfilled hole in the model, or two surface elements can intersect in a way that makes inside and outside classification unclear.

SUMMARY OF THE INVENTION

Volumetric representations readily maintain a watertight model without holes or self-intersections. Such representations naturally support Boolean operations based on a voxel-by-voxel compositing process. It is desirable to support deformations of voxel models to expand the range of operations that can be performed natively within the voxel grid with such models.

A method is described for local modification of voxel models. A voxel is a volume element. A voxel model is given initially. A region to be modified and a warping function are then specified. The inverse of the desired warping function is used to resample the voxel grid over the region of interest. Associated surface or other display parameters are then updated.

In one aspect, the invention relates to a method of calculating a modification of a geometrical shape. The method comprises the steps of defining on a multi-dimensional space an array of values representing a geometrical shape; selecting a modification function that represents a desired modification to be applied to the geometrical shape; applying an inverse function of the modification function to the array of values to produce a modified array; and deducing from the modified array a modification of the geometrical shape that would result from a direct application of the modification function to the array.

In one embodiment, the method further comprises the step of applying the deduced modification to the array. In one embodiment, the method further comprises displaying to a user the modification of the geometrical shape that would result from a direct application of the modification function to the array. In one embodiment, the step of deducing from the modified array a modification further comprises the steps of retrieving an array value from the modified array, and applying the array value from the modified array at a location in the array representing the geometrical shape. In one embodiment, the modification function comprises a soft-edged deformation. In one embodiment, the modification function is applied from a selected one of a first side and a second side of the geometrical shape.

In one embodiment, the method further comprises applying the modification function by manipulation of a virtual tool. In one embodiment, the geometrical shape is displaced away from the virtual tool. In one embodiment, the geometrical shape is displaced toward the virtual tool. In one embodiment, the modification of the geometrical shape is substantially a convex hump. In one embodiment, the modification of the geometrical shape is substantially a concave spiked protuberance. In one embodiment, the modification function comprises a force field consistent with a tool of arbitrary shape. In one embodiment, the modification function comprises translational displacement. In one embodiment, the modification function comprises rotational displacement.

In one embodiment, the modification function comprises a selected one of a displacement function, a smoothing function, a warping function, a volumetric interference, an areal interference, a result of a simulation, a data re-fitting, and a force. In one embodiment, the modification function is represented as a non-linear mathematical function. In one embodiment, the method further comprises the steps of selecting a second modification function; applying an inverse function of the second modification function to the modified array to produce a twice-modified array; and deducing from the twice-modified array a modification of the geometrical shape that would result from an application of the modification function to the array followed by an application of the second modification function to the once-modified array.

In one embodiment, the modification comprises applying a constraint so as to control a magnitude of a change of the geometrical shape. In one embodiment, applying the constraint prevents at least one point of the geometrical shape from moving in response to the application of the inverse function of the modification function. In one embodiment, the modification comprises applying a surface texture to the geometrical shape.

In another aspect the invention features a system for calculating a modification of a geometrical shape. The system comprises a generation module that defines on a multi-dimensional space an array of values representing a geometrical shape; a selection module that provides a modification function representing a desired modification to be applied to the geometrical shape; a transformation module that applies an inverse function of the modification function to the array of values to produce a modified array; and a calculation module that deduces from the modified array a modification of the geometrical shape that would result from a direct application of the modification function to the array.

In one embodiment, the system further comprises a modification module that applies the deduced modification to the array. In one embodiment, the system further comprises a display module that displays to a user the modification of the geometrical shape that would result from a direct application of the modification function to the array.

In one embodiment, the calculation module further comprises a module that retrieves an array value from the modified array, and a module that applies the array value from the modified array at a location in the array representing the geometrical shape. In one embodiment, the modification function comprises a soft-edged deformation. In one embodiment, the modification function is applied from a selected one of a first side and a second side of the geometrical shape.

In one embodiment, the system further comprises a module that applies the modification function by manipulation of a virtual tool. In one embodiment, manipulation of a virtual tool displaces the geometrical shape away from the virtual tool. In one embodiment, manipulation of a virtual tool displaces the geometrical shape toward the virtual tool. In one embodiment, the modification of the geometrical shape is substantially a convex hump. In one embodiment, the modification of the geometrical shape is substantially a concave spiked protuberance. In one embodiment, the modification function comprises a force field consistent with a tool of arbitrary shape. In one embodiment, the modification function comprises translational displacement. In one embodiment, the modification function comprises rotational displacement. In one embodiment, the modification function comprises a selected one of a displacement function, a smoothing function, a warping function, a volumetric interference, an areal interference, a result of a simulation, a data re-fitting, and a force. In one embodiment, the modification function is represented as a non-linear mathematical function.

In one embodiment, the system further comprises a selection module that selects a second modification function; a transformation module that applies an inverse function of the second modification function to the modified array to produce a twice-modified array; and a calculation module that deduces from the twice-modified array a modification of the geometrical shape that would result from an application of the modification function to the array followed by an application of the second modification function to the once-modified array. In one embodiment, the modification comprises applying a constraint so as to control a magnitude of a change of the geometrical shape. In one embodiment, the module that applies the constraint prevents at least one point of the geometrical shape from moving in response to the application of the inverse function of the modification function. In one embodiment, the modification comprises applying a surface texture to the geometrical shape.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

The methods and systems of the invention are carried out using a conventional general purpose computer, such as a commercially available personal computer that comprises a CPU, one or more memories, one or more storage medium, a display, and an input device. The computer is programmed with software comprising commands that when operating direct the computer in the performance of the methods of the invention. Those of skill in the programming arts will recognize that some or all of the commands can be provided in the form of software, in the form of programmable hardware such as flash memory or ROM, in the form of hard-wired circuitry, or in some combination of two or more of software, programmed hardware, or hard-wired circuitry. Commands that control the operation of a computer are often grouped into units that perform a particular action, such as receiving information, processing information or data, and providing information to a user. Such a unit can comprise any number of instructions, from a single command, such as a single machine language instruction, to a plurality of commands, such as a plurality of lines of code written in a higher level programming language such as C++. Such units of commands will be referred to generally as modules, whether the commands comprise software, programmed hardware or hard-wired circuitry, or a combination thereof.

In alternative embodiments, the computer is a laptop computer, a minicomputer, a mainframe computer, an embedded computer, or a handheld computer. The memory is any conventional memory such as, but not limited to, semiconductor memory, optical memory, or magnetic memory. The storage medium is any conventional machine-readable storage medium such as, but not limited to, floppy disk, hard disk, CD-ROM, and/or magnetic tape. The display is any conventional display such as, but not limited to, a video monitor, a printer, a speaker, an alphanumeric display and/or a force feedback haptic interface device. The input device is any conventional input device such as, but not limited to, a keyboard, a mouse, a force-feedback haptic interface device, a touch screen, a microphone, and/or a remote control. The computer can be a stand-alone computer or interconnected with at least one other computer by way of a network.

Figure 1:
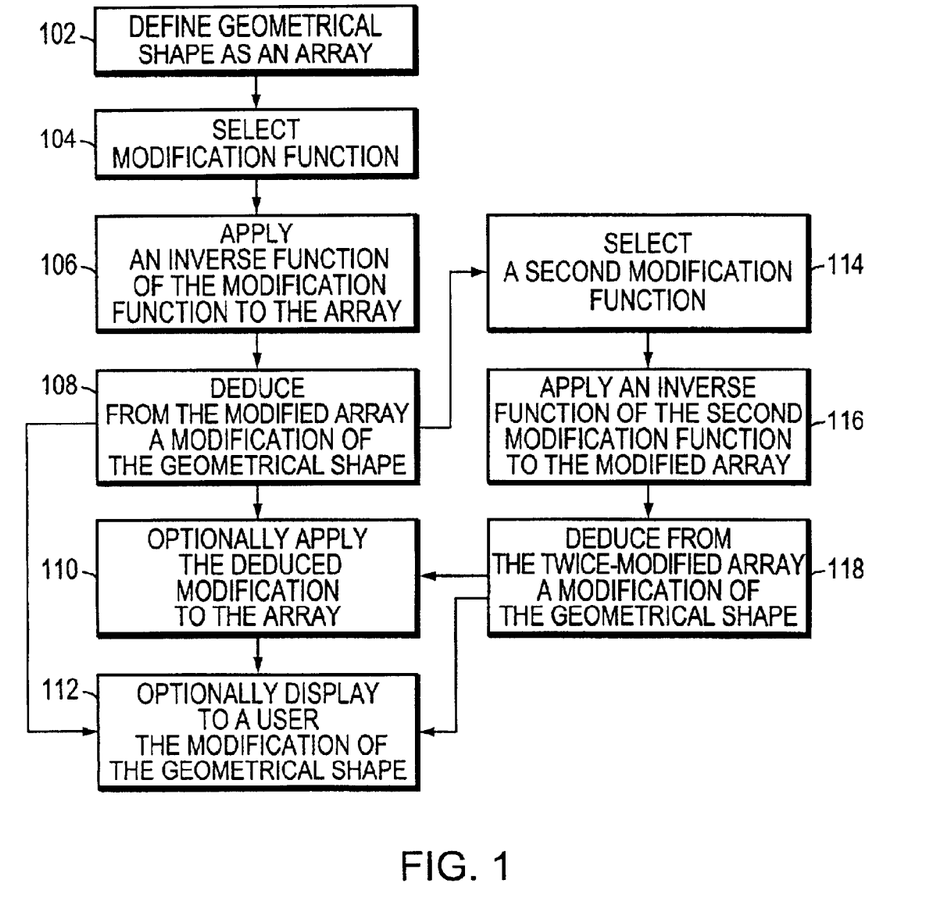
FIG. 1 is an illustrative flow diagram showing the steps performed according to an embodiment of the invention.

FIG. 1 shows a flow diagram that illustrates the steps in one embodiment of the invention, and equivalently, illustrates the functions of modules that control the operation of the system. As indicated in box 102, a geometrical shape to be modified is defined as an array of values in a computer memory. As indicated in box 104, a user or a programmed computer selects a modification function to be applied to the geometrical shape. As indicated in box 106, the programmed computer applies an inverse function of the modification function to the array that represents the geometrical shape to be modified, which results in a modified array of values. As indicated at box 108, the programmed computer deduces a modification of the geometrical shape from the modified array of values. In some embodiments, as indicated at box 110, the deduced modification is optionally applied to the array of values in memory that represent the geometrical shape, and is available for storage for later use. In some embodiments, as indicated in box 112, the modification of the geometrical shape is optionally displayed to a user by way of a display device. The optional display of the modification of the geometrical shape can be performed independent of the optional application of the deduced modification to the array of values, as indicated by an arrow pointing directly from box 108 to box 112.

FIG. 1 further shows that, in some embodiments, a second modification function can be applied to the modified array to further modify the geometrical shape. As indicated at box 114, in one embodiment, a user or a programmed computer selects a second modification function to be applied to the once-modified array corresponding to a once modified geometrical shape. As indicated at box 116, the programmed computer applies an inverse function of the second modification function to the modified array to produce a twice-modified array. As indicated at box 118, the programmed computer deduces from the twice-modified array a modification of the geometrical shape that would result from an application of the modification function to the array followed by an application of the second modification function to the once-modified array. In principle, any number of modifications can be performed by applying successive modification functions to an array. In addition, a modification can be undone by recalling a previously stored array corresponding to the geometrical shape as it was prior to the application of the modification function.

FIGS. 2A through 2D show an illustrative example of the application of a modification function to a two dimensional space represented by an array of values. The use of the inverse function is illustrated in the sequence of FIGS. 2A–2D.

Figure 2A:
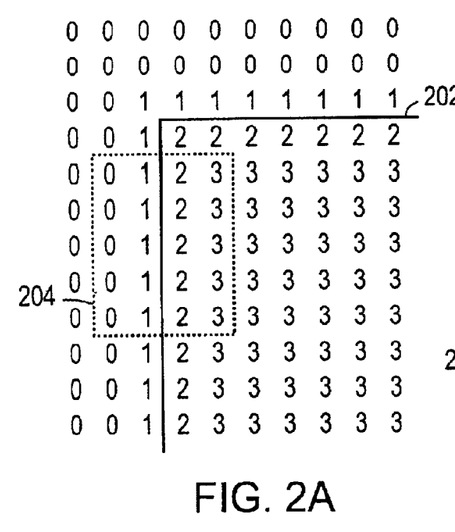
FIGS. 2A through 2D show an illustrative example of the application of a modification function to a two dimensional space represented by an array of values, according to principles of the invention.

FIG. 2A shows an initial condition of a two-dimensional object 200, which is, for example, a topographical map of an area. The values entered in the two-dimensional array of FIG. 2A represent an elevation of the square upon which each value is displayed. The solid line 202 shows the locus of points having an elevation of 1.5 units, e.g., an isoelevation. The dotted line 204 encloses a region of the two-dimensional object 200 that is to be displaced one unit to the right. According to methods of the invention, rather than moving the region enclosed by dotted line 204 directly, an inverse function is determined, namely, moving the enclosing line 204 one unit to the left, and moving the array entries so identified one unit to the right.

Figure 2B:
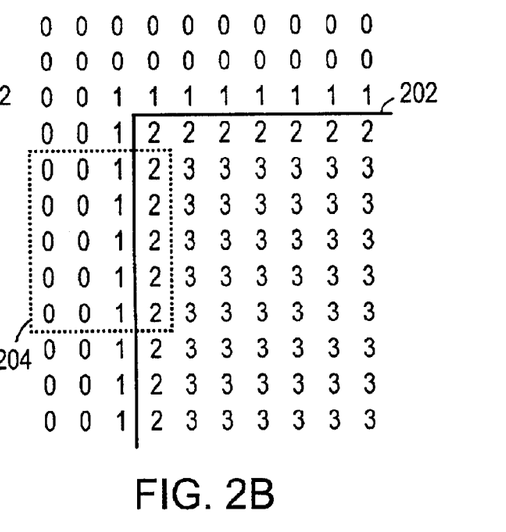

In FIG. 2B, the dotted line 204' illustrates the position of dotted line 204 after the inverse function is applied to dotted line 204. In FIG. 2B, no array entry has yet been moved.

Figure 2C:
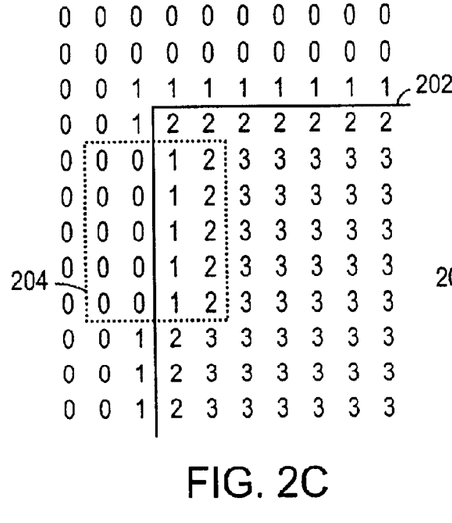

In FIG. 2C, the array entries identified within the region circumscribed by the dotted line 204' of FIG. 2B are copied to the locations identified by the original dotted line 204 of FIG. 2A. It is to be observed that the net result of the operations illustrated in FIGS. 2B and 2C is equivalent to moving each array entry found within the dotted lien 204 of FIG. 2A one unit to the right within FIG. 2A.

Figure 2D:
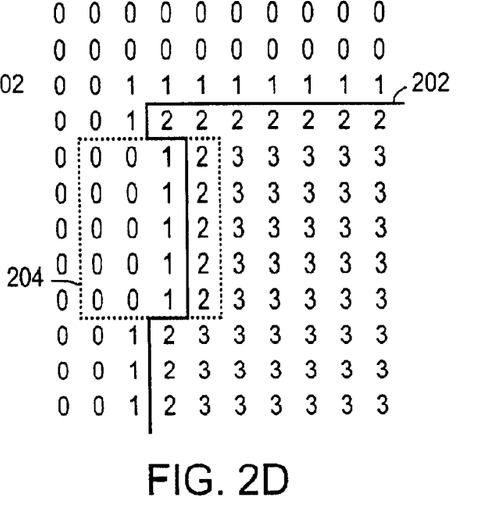

Finally, in FIG. 2D the line 202 is redrawn to indicate substantially the new locus of the isoelevation having a height of 1.5 units. It will be understood that this example is illustrative, and that appreciably more complex modifications of three-dimensional shapes are contemplated.

In order to perform the methods of the invention, an initial model is created. In a preferred embodiment, a voxel model is the input for the warping process. This model comes from various sources including scans of physical objects or prior interactive editing. The voxel model, or an alternative initial model, is represented by numerical values maintained in computer memory in an array.

A modification function used to modify the initial model is selected or otherwise identified by a user or by a programmed computer. The modification function is intended to be applied to the initial model in order to modify an attribute or value of the model, which represents a change in a geometrical shape of the object represented by the model.

Figure 3:
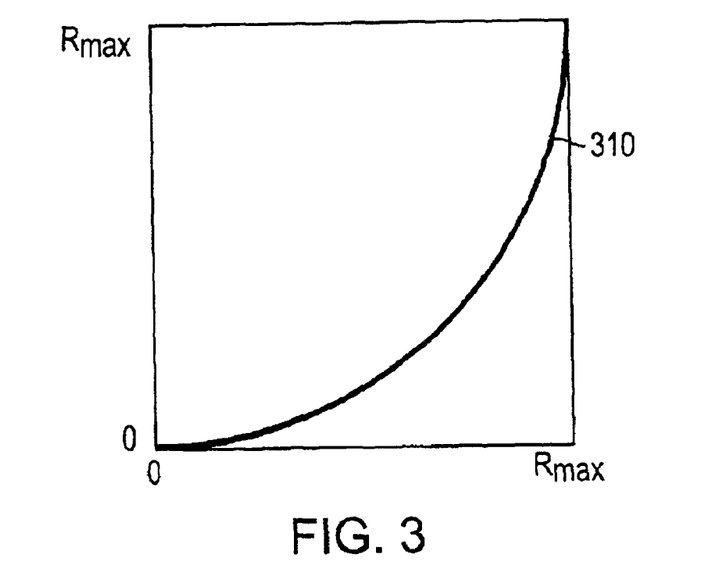
FIG. 3 is a graph of an exemplary forward warping function, according to an embodiment of the invention.
Figure 4:
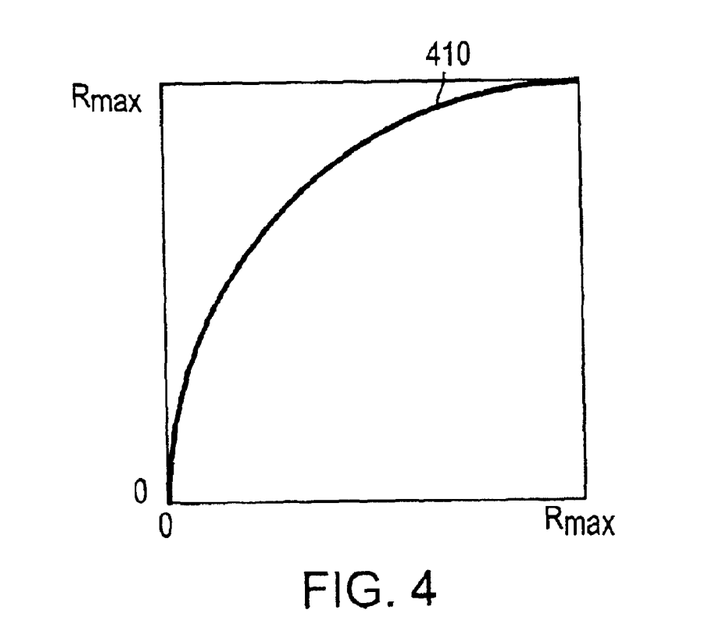
FIG. 4 is a graph of an inverse of warping function based on the exemplary warping function of FIG. 3, according to an embodiment of the invention.

A modification, or warping, function is any mathematical function that takes a multi-dimensional (commonly three-dimensional) position within some domain as an input and provides a multi-dimensional (commonly three-dimensional) position within some range as an output. An example is depicted in FIG. 3. The modification or warping function 310 is preferably invertible, that is, for each point in the range a unique point in the domain can be determined. An inverted modification function 410 or warping function 410 based on the example in FIG. 3 is depicted in FIG. 4.

A modification or warping function can have constraints. In some embodiments, the modification or warping function will have a limited region of influence, and will have a magnitude of effect that falls to 0 (no displacement) at least one limit of the modification or warping function. These constraints prevent the introduction of discontinuities in the model.

In some embodiments, the domain and range are the same, for example, in the illustrative examples presented here. When the domain and the range differ, material moved in the course of the modification or warp can overlap previously existing material. When such an overlap occurs, a computation is performed to account for the overlap. In one illustrative embodiment, the value that is accepted as the correct value is the maximum voxel value of one of the modified or warped voxel and the original voxel. In some embodiments, the modification that is needed is deduced by retrieving an array value from the array after it is modified, and applying the array value from the modified array at a location in the array representing the geometrical shape.

A smoothness constraint is useful to avoid introducing creases or other artifacts during modification or warping. Such a constraint can be introduced by limiting a derivative of a tangent to a surface or an absolute change in magnitude of a surface value. In some embodiments, a constraint is applied so as to control a magnitude of a change in the geometrical shape. In some embodiments, the constraint prevents a point of the geometrical shape from moving.

In some embodiments, the modification is a surface texture that is applied to the geometrical shape. For example, a surface texture such as the "pebble grain" on the surface of a football, or a surface texture such as the indentations present on the surface of a golf ball, can be applied to a surface. In some embodiments, the modification is a soft-edged deformation, e.g. a deformation having a smooth and flowing shape at an edge. In some embodiments, the modification is applied from one side of a geometrical shape (for example, the inside). In other embodiments, the modification is applied from a second side of a geometrical shape (for example, the outside).

In some embodiments, the modification is accomplished by use of a modification function comprising a force field that is substantially consistent with a tool of arbitrary shape. In some embodiments, the modification function comprises translational displacement. In other embodiments, the modification function comprises rotational displacement. In some embodiments, the modification function comprises a selected one of a displacement function, a smoothing function, a warping function, a volumetric interference, an areal interference, a result of a simulation, a data re-fitting and a force. In some embodiments, the modification function is represented as a non-linear mathematical function.

FIG. 3 is a graph of an exemplary forward warping function 310. The curve 310 of FIG. 3 falls below a straight line rising at 45 degrees from the origin. One observes that under the influence of the function 310 depicted in FIG. 3, material within the affected area shrinks toward the center of projection if the force between the center of projection and the material comprising the geometrical shape is attractive. A center of projection is represented by a virtual tool displayed on a computer system display for a user. In other embodiments, different warping functions will have other properties. In some embodiments, the force between a center of projection and the geometrical shape is repulsive. In other embodiments, different warping functions will have other properties.

FIG. 4 is a graph of an inverse warping function 410 based on the exemplary warping function 310 of FIG. 3. The voxel values in the geometrical shape to be modified are computed by using the inverse function 410 to map output grid points in the array to input locations in the geometrical shape.

Figure 5:
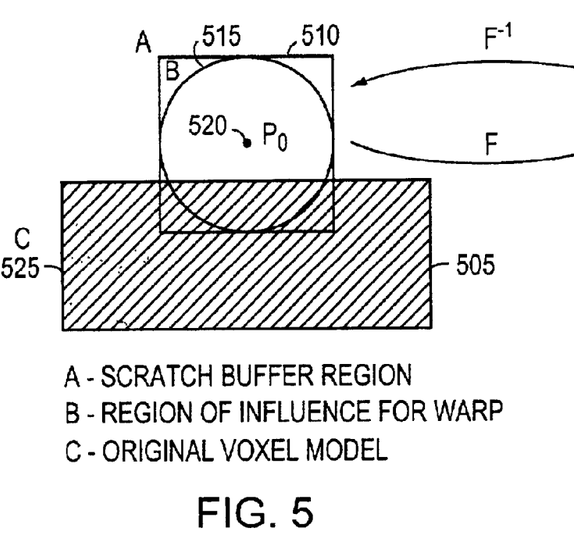
FIG. 5 is a diagram that depicts the components of an illustrative warp, according to an embodiment of the invention.

FIG. 5 is a diagram that depicts the components of an illustrative warp. A geometrical shape 505 that to be modified is shown. In FIG. 5, region A 510 depicts voxels that correspond to a scratch buffer region that is used for computation of the change in the geometrical shape. Region B 515 depicts a region of influence of the warping function, based on a central point $P_0$ 520. Region C 525 represents the original voxel model of geometrical shape 505. For the selected modification function, only that portion of the model contained within the region of influence B 515 of the modification is expected to change shape.

The user or the programmed computer specifies a region of application for the warp. The portion of the voxel model to be altered by the warping function is specified, either through user interaction or automatically. This portion includes the mathematical union of the domain, that is, the portion of the voxel grid serving as input to the warp, and the range of the warping, the portion of the voxel grid containing the positions after warping.

The programmed computer determines a voxel region affected by the warp. This region includes the entire region of application of the warp determined in the previous step, but can larger. A larger region can is some instances simplify computer processing. In one embodiment, an example for such a region, the voxel region may be an axis-aligned rectangular region of a size that contains the region of application, which region of application may for example be irregular in shape. Alternative examples of computational regions are regions that circumscribe the voxel region of interest having a regular volumetric shape, having symmetry of various degrees, or having other computationally-efficient attributes.

Figure 6:
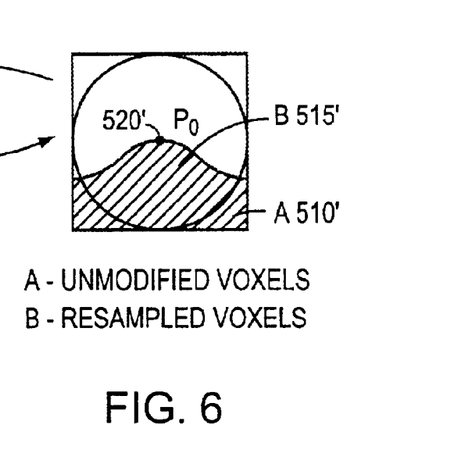
FIG. 6 is a diagram that depicts the actions that correspond to an illustrative warp, according to an embodiment of the invention.

FIG. 6 is a diagram that depicts the actions that correspond to an illustrative warp. FIG. 6 depicts regions A 510' and B 515', as well as central point $P_0$ 520'. In FIG. 6, the second voxel region is filled by application of the inverse warping function to the geometrical shape. The region denoted by A 510' represents voxels unchanged by the warp. The region denoted by B 515' represents voxels changed by resampling, as depicted in a two-dimensional representation of a multi-dimensional space. The changed shape is incorporated back into the original geometrical shape, as indicated with respect to FIG. 7.

The programmed computer resamples the voxels. A second voxel region, which is referred to as the scratch buffer, is defined with the same dimensions as the voxel region affected by the warp. For each grid point in the second voxel region, the corresponding point in the first voxel region is found by application of the inverse warp function. This point is possibly not aligned with the voxel grid. A value is computed for this output point by interpolation of the input voxel grid. In one embodiment, the computation is a trilinear interpolation over the 8 voxel neighbors of the input point. The derived value or values are stored in the scratch buffer at the output point location. Repeating the calculation for every voxel in the second voxel region determines the complete warp.

Figure 7:
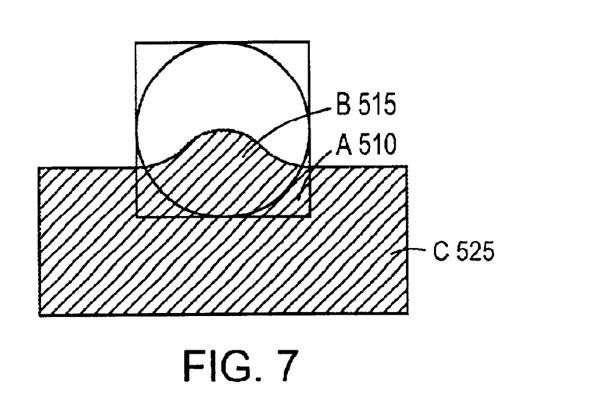
FIG. 7 is a diagram of the result of the illustrative warp on the original voxel region, according to an embodiment of the invention.

FIG. 7 is a diagram of the result of the illustrative warp on the original voxel region. In FIG. 7, the region C 525 is substantially the same shape as it was before the application of the modification function or its inverse function. The region A 510 includes voxels which were not affected by the application of the modification or warping function, even though they are part of the multi-dimensional representation that is being modified. The portion of the geometrical shape within the region B 515 are modified in shape by application of the inverse of the modification or warping function, and that change in shape is reflected in the original array, corresponding to the original geometrical shape. The changes in shape are obtained, in one embodiment, from the scratch buffer array of modified data.

The scratch buffer voxels are copied into the original voxel grid. Each point stored in the second voxel grid is moved into the original voxel grid to effect the changes in the model. The voxel model properties are updated to reflect the changed region. Haptic or graphic properties are updated as appropriate, and are optionally presented to a user. In one embodiment, a voxel display handled via an isosurface is updated by updating the isosurface for the changed region.

Some exemplary applications of voxel warping are presented below. The applications are embodied in a software package available from SensAble Technologies, Inc., Woburn, Mass., which package is called the FreeForm™ modeling system. The software package includes a number of tools, which are presented using graphical user interface technology. As will be understood by those of skill in the programming arts, equivalent commands can be implemented using other interfaces, such as text-based interfaces. While one specific embodiment is presented for each tool, it will be understood by those of ordinary skill in the computer programming arts that other embodiments are possible. These tools are:

Interactive Smoothing: smoothing is performed while a ball-shaped tool is passed over a surface of a three-dimensional object.

Smudge: material is pushed away from a tool while carving/adding/extruding a three-dimensional shape.

Boolean Smooth: a smoothing while carving operation for use with a three-dimensional object.

Attract: material is attracted to the center of a tool. This operation is useful for raising bumps or creating smooth valleys in a three dimensional object.

Spikes: material is attracted to the edge of the tool and is useful in creating spikes.

The software includes interactive smoothing controlled by the smoothing dynabar of a user interface; a Smudge tool with its own left-hand toolbar button that operates in carve and pull modes; Boolean smoothing as a user-accessible selection for all of the carving tools; and Attract and Spikes as specialized-use tools on a Tools->Special Effects pull-down menu.

Interactive Smoothing Tool

Figure 8:
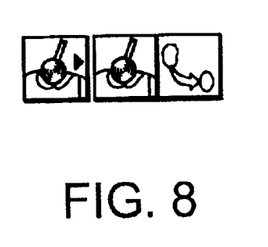
FIG. 8 is a graphical user interface used to activate the interactive smoothing tool, according to an embodiment of the invention.
Figure 9:
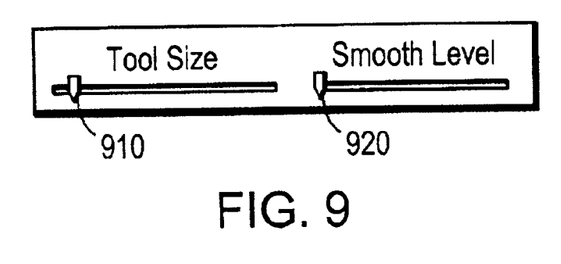
FIG. 9 is a graphical user interface used to control the properties of the interactive smoothing tool, according to an embodiment of the invention.

Interactive Smoothing is the default selection on the smoothing flyout (a context-dependent user interface component brought up when its corresponding button is pressed) graphical user interface as shown in FIG. 8. Once the user presses the Smooth button, (as distinct from a button called Smooth Area) on the left-hand bar, the smooth dynabar appears. The smooth dynabar is a graphical user interface used to control the properties of the interactive smoothing tool, and is shown in FIG. 9. The sliders 910, 920 for Smoothing have similar controls and ranges as Smooth Area. The Smoothing tool size is the same visually as the Smooth Area tool and affects the same area. For instance, smoothing a swath yields a similar result as painting a swath, and then activating a command "apply" to apply the action to the representation of the area in memory. Once the tool size and smooth level is adjusted by the user by controlling sliders 910 and 920, respectively, the tool size and smooth level are defined until reset for the Smoothing tool, as is the case with the Smooth Area tool.

Smudge Tool

Figure 10:
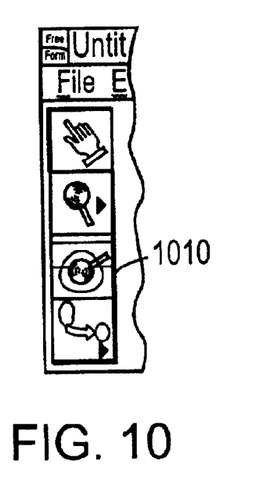
FIG. 10 is a graphical user interface used to invoke the Smudge tool, according to an embodiment of the invention.
Figure 11:
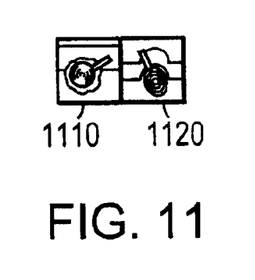
FIG. 11 is a graphical user interface used to control a mode of operation of the Smudge tool, according to an embodiment of the invention.

The Smudge tool has an icon 1010 below the ball tool as shown in the graphical user interface depicted in FIG. 10. In one embodiment, the Smudge tool has two modes, Smudge from Inside 1110 and Smudge from Outside 1120, which are shown in FIG. 11. The Smudge tool works well with the ball tool, according to one preferred embodiment. When the user selects the smudge tool, a status bar appear, which is a graphical user interface control shown in FIG. 12.

Figure 12:
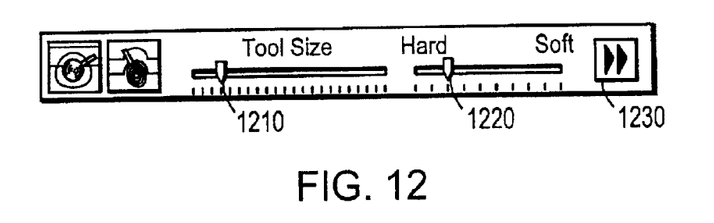
FIG. 12 is a graphical user interface used to control the properties of the Smudge tool, according to an embodiment of the invention.
Figure 13:
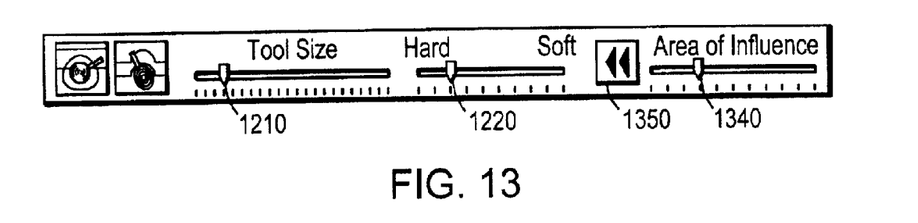
FIG. 13 is another graphical user interface used to control the properties of the Smudge tool, according to an embodiment of the invention.

One mode of controlling the tool size of the Smudge tool is to operate slider 1210. Motion of the slider 1210 to the left decreases tool size and motion to the right increases tool size, according to one embodiment of the invention. One mode of controlling the hardness of the clay that the user manipulates is to operate slide 1220. Motion of the slider 1220 to the left increases clay hardness and motion to the right decreases clay hardness, according to one embodiment of the invention. Another method of selecting and controlling tool size and clay hardness is the same as within the standard carving mode including the "T" key to toggle, the +/−keys for changing tool size, and the number keys for changing clay softness. When the user presses the ">>" key 1230, the Area of Influence slider 1340 pops up as shown in FIG. 13.

The Area of Influence slider 1340 changes the amount of material outside of the tools shape that is affected by the Smudge tool and Smudge process. The slider has a range from 125% to 200% of the tool size radius with the middle setting as the default. These size and level setting persist during the work session, but do not need to be written in the preferences file. The result is that these settings work exactly the same as the tool/clay settings in Carving Tool Mode. When the user presses the "<<" button 1350, the Area of Influence slider 1340 will be hidden from view, but retains its setting. The ">>" (Advanced) button state is written to the user preferences. Once the user has activated it, it stays open until closed by the user.

Boolean Smoothing Tool/Smooth While Carving

Figure 14:
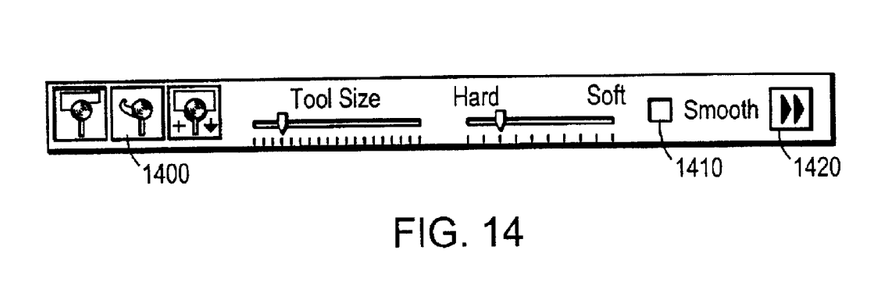
FIG. 14 is a graphical user interface used to control the properties of the Boolean smoothing tool, according to an embodiment of the invention.
Figure 15:
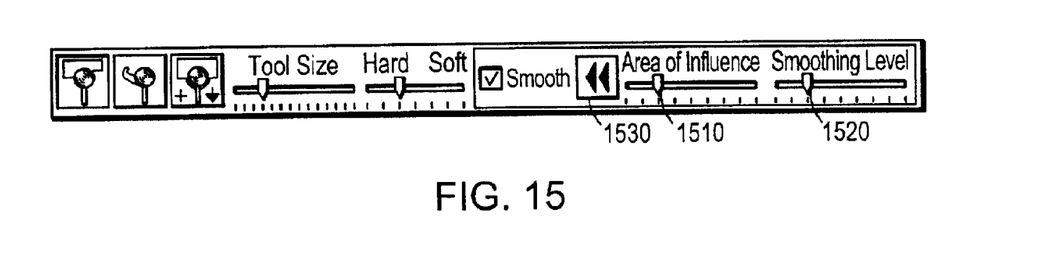
FIG. 15 is another graphical user interface used to control the properties of the Boolean smoothing tool, according to an embodiment of the invention.

The Boolean Smoothing tool, which provides the functionality of Smooth while Carving is an option that is controlled by activating the check box 1410 on the cutting tools dynabar 1400, as shown in FIG. 14. In action, Boolean smoothing combines the effects of first carving a region to be modified in a standard Boolean fashion, then applying a local smoothing operation to the region, giving the effect of a soft-edged carve. When the user checks the smooth box, Boolean smoothing commences using parameters defined by the mid-points of the two sliders described below in conjunction with FIG. 15. When the ">>" (Advanced) button 1420 is selected, the bar shown in FIG. 15 appears. FIG. 15 shows a control bar that has increased in size from that of FIG. 14 to display controls for the smoothed region outside of the cutting tool including Area of Influence slider 1510 (which scales from 125% to 200% of the tool size) and Smooth Level slider 1520. When the user presses the "<<" button 1530, the Area of Influence area is hidden from view, but retains its settings. When the advanced controls are available, but smooth is not selected, these sliders gray out to provide a visual notification to the user that Boolean smooth is not active. These size and level settings persist during the work session, but are not written in the preferences file. The ">>" (Advanced) button 1420 state is written to the user preferences file once the user activates the Advanced feature. The Advanced feature remains open until closed by the user.

Attract and Spikes

Figure 16:
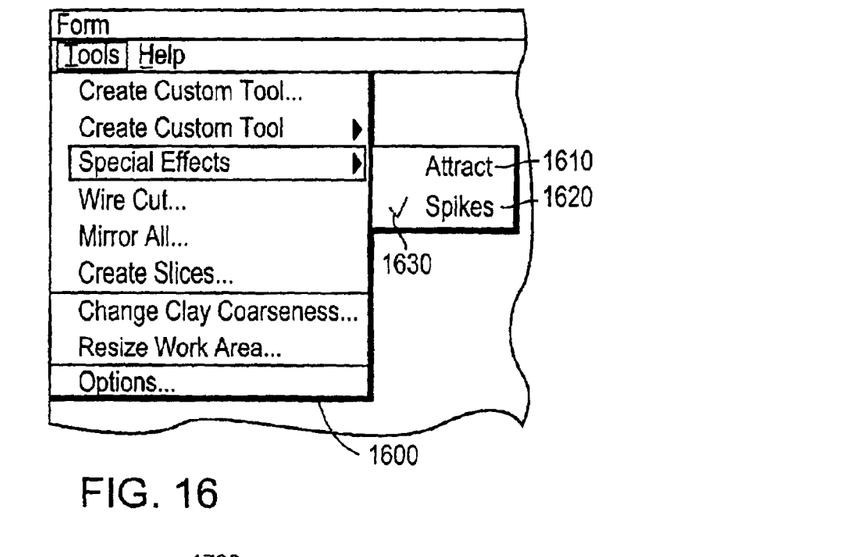
FIG. 16 is a graphical user interface pull-down menu used to activate the Attract and Spikes tools, according to an embodiment of the invention.

Attract and Spikes are tools in the Special Effects library. These tools are accessible on the Tools—>Special Effects menu 1600 as shown in FIG. 16. FIG. 16 is a graphical user interface pull-down menu used to activate the Attract and Spikes tools, which is used in a manner similar to other well-known pull-down menus. When the menu selection Attract 1610 is activated, the Attract tool is active. When the menu selection Spikes 1620 is activated, the Spikes tool is active. The check mark 1630 adjacent to the Spike 1620 menu selection indicates that the Spikes tool is active.

Attract Tool

Figure 17:
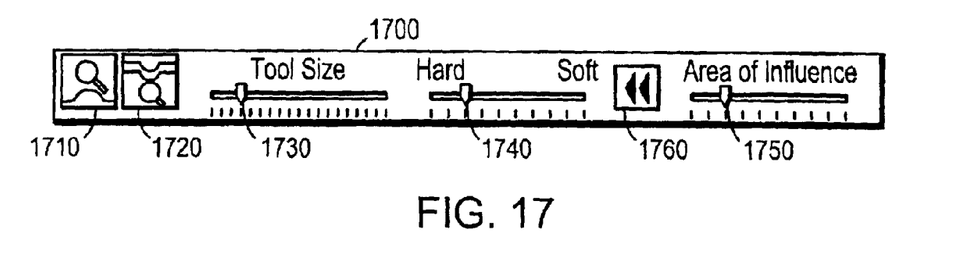
FIG. 17 is a graphical user interface used to used to control the properties of the Attract tool, according to an embodiment of the invention.

When Attract is chosen, the control bar 1700 shown in FIG. 17 appears. The bar provides two buttons: Bulge 1710 and Indent 1720. These features are the equivalent of Attract from Outside and Attract from Inside, respectively. In one embodiment, the user controls tool size using the Tool Size slider 1730 and controls clay hardness using the slider 1740. These selections work the same as they do in carving tools mode. Activating the ">>" (Advanced) button, not shown, causes the Area of Influence slider 1750 to appear. The slider has a range of 125% to 200% of the tool size. The default is in the middle of the range. As with all of the other tools above, when the user presses the "<<" button 1760, the Area of Influence slider 1750 is hidden, but retains its setting. These size and level settings persist during the work session, but do not need to be written in the preferences file. The ">>" (Advanced) button state is written to the user preferences once the user has activated it. The Advanced button remains stay open until closed by the user. As with the other, similar toolbars, the "T" key toggles between the tool choices.

Spikes Tool

Figure 18:
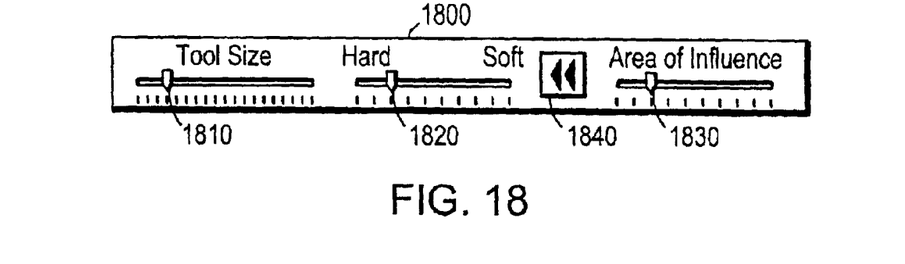
FIG. 18 is a graphical user interface used to used to control the properties of the Spikes tool, according to an embodiment of the invention.

FIG. 18 shows an exemplary graphical user interface 1800 for Spikes. This graphical user interface is nearly identical to the user interface for Attract, and works in a similar manner. The graphical user interface includes a Tool Size slider control 1810, a clay hardness slider control 1820, an area of influence slider control 1830 and a "<<" button 1840 that, when activated, hides the area of influence slider control 1830.

Tool Appearance

Figure 19:
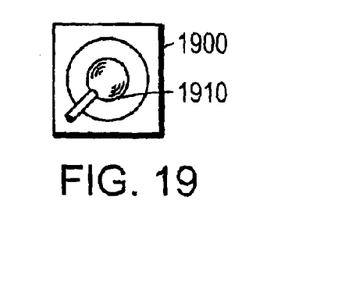
FIG. 19 is a graphical user interface used to depict the location of a tool in virtual space for the convenience of a viewer, according to an embodiment of the invention.
Figure 20:
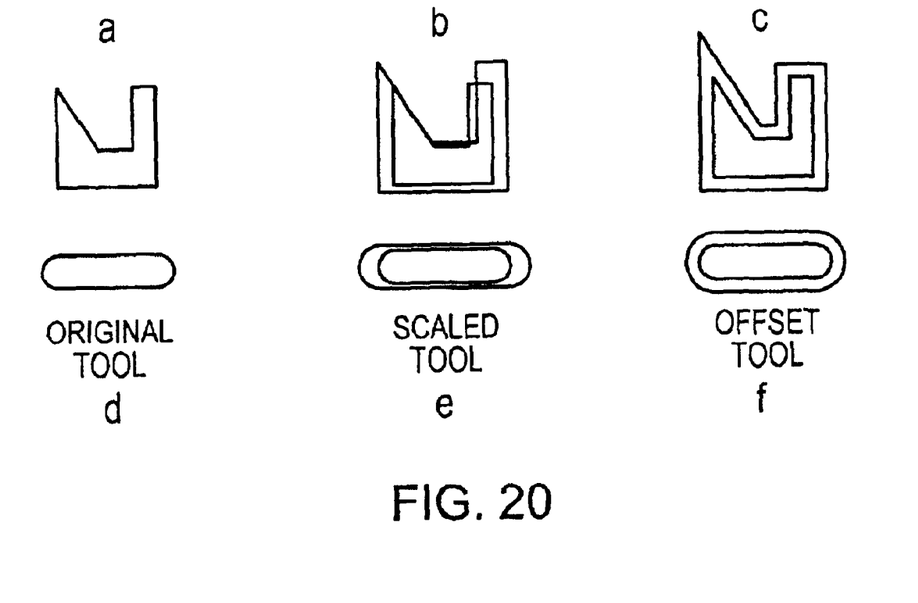
FIGS. 20A through 20F are schematic diagrams showing two tool shape, the result of scaling the two tool shapes, and the results of offseting the tools, according to an embodiment of the invention.

When any tool is selected that has an area of influence slider as described above, a semi-transparent tool shape 1900, of the appropriate size and shape, such as the embodiment shown in FIG. 19, appears centered about the location of the tool in virtual space. This shape 1900 changes size in direct relationship with the Area of Influence Slider and with a nonlinear relationship with the Tool Size Slider, which represents a percentage, rather than an absolute value of the tool size. The semi-transparent shell 1910 disappears while the tool is modifying the surface, for ease of viewer use. The transparent shell 1900 is offset from the cutting tool 1920, rather than being scaled, as is apparent from FIGS. 20A through 20F shown below. FIGS. 20A and 20D show two possible initial tool shapes, a polygon and an oval, respectively. FIGS. 20B and 20E show the effect of trying to offset the tool shape via simple scaling, giving in some cases an incorrect result. FIGS. 20C and 20F show the effect of offsetting the tool shape by a constant distance taking into account changes in shape during the offset. As shown in the examples, the offset oval is thicker than the original oval, and the offset polygon has different proportions of the corresponding edge lengths. In one embodiment a tool smoothes in a bounding box that fits around the tool. In another embodiment, the region matches the offset, rendered shell, rather than a bounding box.

INCORPORATION BY REFERENCE

U.S. patent application Ser. No. 09/347,637, filed Jul. 6, 1999, is hereby incorporated by reference herein in its entirety.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of modifying a geometrical shape, comprising the steps of:
    defining in a multi-dimensional space an array of values representing a geometrical shape;
    selecting a modification function that represents a desired modification to be applied to the geometrical shape;
    applying an inverse function of the modification function to the array of values to produce a modified array;
    deducing from the modified array a modification of the geometrical shape that would result from a direct application of the modification function to the array; and
    applying the resulting modification of the geometrical shape by manipulation of a virtual tool, wherein the geometrical shape is displaced with respect to the virtual tool.

2. The method of claim 1, further comprising displaying to a user the modification of the geometrical shape that would result from a direct application of the modification function to the array.

3. The method of claim 1, wherein the step of deducing from the modified array a modification further comprises the steps of:
    retrieving an array value from the modified array; and
    applying the array value from the modified array at a location in the array representing the geometrical shape.

4. The method of claim 1, wherein the modification function comprises a soft-edged deformation.

5. The method of claim 1, wherein the modification function is applied from a selected one of a first side and a second side of the geometrical shape.

6. The method of claim 1, wherein the geometrical shape is displaced away from the virtual tool.

7. The method of claim 1, wherein the geometrical shape is displaced toward the virtual tool.

8. The method of claim 7, wherein the modification of the geometrical shape is substantially a convex hump.

9. The method of claim 7, wherein the modification of the geometrical shape is substantially a concave spiked protuberance.

10. The method of claim 1, wherein the modification function comprises a force field consistent with a tool of arbitrary shape.

11. The method of claim 1, wherein the modification function comprises translational displacement.

12. The method of claim 1, wherein the modification function comprises rotational displacement.

13. The method of claim 1, wherein the modification function comprises a selected one of a displacement function, a smoothing function, a warping function, a volumetric interference, an areal interference, a result of a simulation, a data re-fitting, and a force.

14. The method of claim 1, wherein the modification function is represented as a non-linear mathematical function.

15. The method of claim 1, further comprising the steps of:
    selecting a second modification function;
    applying an inverse function of the second modification function to the modified array to produce a twice-modified array; and deducing from the twice-modified array a modification of the geometrical shape that would result from an application of the modification function to the array followed by an application of the second modification function to the once-modified array.

16. The method of claim 1, wherein the modification comprises applying a constraint so as to control a magnitude of a change of the geometrical shape.

17. The method of claim 16, wherein applying the constraint prevents at least one point of the geometrical shape from moving in response to the application of the inverse function of the modification function.

18. The method of claim 1, wherein the modification comprises applying a surface texture to the geometrical shape.

19. A system for modifying a geometrical shape, comprising:

a generation module that defines in a multi-dimensional space an array of values representing a geometrical shape;

a selection module that provides a modification function representing a desired modification to be applied to the geometrical shape;

a transformation module that applies an inverse function of the modification function to the array of values to produce a modified array;

a calculation module that deduces from the modified array a modification of the geometrical shape that would result from a direct application of the modification function to the array; and a modification module that applies the resulting modification of the geometrical shape by manipulation of a virtual tool, wherein the geometrical shape is displaced with respect to the virtual tool.

20. The system of claim 19, further comprising a display module that displays to a user the modification of the geometrical shape that would result from a direct application of the modification function to the array.

21. The system of claim 19, wherein the calculation module further comprises:

a module that retrieves an array value from the modified array; and a module that applies the array value from the modified array at a location in the array representing the geometrical shape.

22. The system of claim 19, wherein the modification function comprises a soft-edged deformation.

23. The system of claim 19, wherein the modification function is applied from a selected one of a first side and a second side of the geometrical shape.

24. The system of claim 19, wherein manipulation of a virtual tool displaces the geometrical shape away from the virtual tool.

25. The system of claim 19, wherein manipulation of a virtual tool displaces the geometrical shape toward the virtual tool.

26. The system of claim 25, wherein the modification of the geometrical shape is substantially a convex hump.

27. The system of claim 25, wherein the modification of the geometrical shape is substantially a concave spiked protuberance.

28. The system of claim 19, wherein the modification function comprises a force field consistent with a tool of arbitrary shape.

29. The system of claim 19, wherein the modification function comprises translational displacement.

30. The system of claim 19, wherein the modification function comprises rotational displacement.

31. The system of claim 19, wherein the modification function comprises a selected one of a displacement function, a smoothing function, a warping function, a volumetric interference, an areal interference, a result of a simulation, a data re-fitting, and a force.

32. The system of claim 19, wherein the modification function is represented as a non-linear mathematical function.

33. The system of claim 19, further comprising:

a selection module that selects a second modification function;

a transformation module that applies an inverse function of the second modification function to the modified array to produce a twice-modified array; and a calculation module that deduces from the twice-modified array a modification of the geometrical shape that would result from an application of the modification function to the array followed by an application of the second modification function to the once-modified array.

34. The system of claim 19, wherein the modification comprises applying a constraint so as to control a magnitude of a change of the geometrical shape.

35. The system of claim 34, wherein the module that applies the constraint prevents at least one point of the geometrical shape from moving in response to the application of the inverse function of the modification function.

36. The system of claim 19, wherein the modification comprises applying a surface texture to the geometrical shape.

* * * * *